United States Patent
Yu et al.

(10) Patent No.: US 8,117,333 B1
(45) Date of Patent: *Feb. 14, 2012

(54) SYSTEMS AND METHODS FOR DISTRIBUTED DATA FORWARDING

(75) Inventors: Junying James Yu, San Jose, CA (US); Dennis C. Ferguson, Palo Alto, CA (US); Hasan F. Ugurdag, San Jose, CA (US); Atsushi Kasuya, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 3013 days.

This patent is subject to a terminal disclaimer.

(21) Appl. No.: 10/419,798

(22) Filed: Apr. 22, 2003

Related U.S. Application Data

(60) Provisional application No. 60/382,020, filed on May 22, 2002.

(51) Int. Cl.
G06F 15/16 (2006.01)
G06F 15/173 (2006.01)
H04L 12/28 (2006.01)
(52) U.S. Cl. .................. 709/238; 709/231; 370/394
(58) Field of Classification Search ............... 370/394; 709/231, 238, 245
See application file for complete search history.

(56) References Cited

U.S. PATENT DOCUMENTS

| | | | |
|---|---|---|---|
| 5,282,201 A * | 1/1994 | Frank et al. | 370/403 |
| 5,898,873 A * | 4/1999 | Lehr | 717/125 |
| 6,246,684 B1 * | 6/2001 | Chapman et al. | 370/394 |
| 6,389,419 B1 | 5/2002 | Wong et al. | |
| 6,477,168 B1 | 11/2002 | Delp et al. | |
| 6,546,391 B1 | 4/2003 | Tsuruoka | |
| 6,600,741 B1 | 7/2003 | Chrin et al. | |
| 6,618,760 B1 * | 9/2003 | Aramaki et al. | 709/240 |
| 6,747,972 B1 | 6/2004 | Lenoski et al. | |
| 6,788,686 B1 | 9/2004 | Khotimsky et al. | |
| 6,816,492 B1 | 11/2004 | Turner et al. | |
| 6,876,952 B1 | 4/2005 | Kappler et al. | |
| 6,967,951 B2 * | 11/2005 | Alfano | 370/394 |
| 7,072,342 B1 * | 7/2006 | Elnathan | 370/394 |
| 7,085,274 B1 * | 8/2006 | Rahim et al. | 370/394 |
| 7,120,149 B2 * | 10/2006 | Salamat | 370/394 |
| 7,289,508 B1 | 10/2007 | Greene | |
| 7,586,917 B1 * | 9/2009 | Ferguson et al. | 370/394 |
| 7,953,094 B1 | 5/2011 | Greene | |
| 2001/0049729 A1 * | 12/2001 | Carolan et al. | 709/220 |
| 2002/0075873 A1 | 6/2002 | Lindhorst-Ko et al. | |
| 2002/0122424 A1 | 9/2002 | Kawarai et al. | |

(Continued)

OTHER PUBLICATIONS

Office Action from U.S. Appl. No. 12/511,856, dated Aug. 16, 2011, 9 pages.

(Continued)

Primary Examiner — Brian J Gillis
(74) Attorney, Agent, or Firm — Harrity & Harrity, LLP

(57) ABSTRACT

A network device includes at least one input interface, at least one processing path and at least one output interface. The at least one input interface receives data blocks from a plurality of streams in a first order. The at least one processing path processes each of the data blocks, the processing including performing one or more route look-ups for each of the data blocks. The at least one output interface re-orders the data blocks based on a number of the one or more route look-ups associated with each of the data blocks.

30 Claims, 7 Drawing Sheets

U.S. PATENT DOCUMENTS

| | | | |
|---|---|---|---|
| 2002/0131414 | A1 | 9/2002 | Hadzic |
| 2002/0147721 | A1 | 10/2002 | Gupta et al. |
| 2002/0150043 | A1 | 10/2002 | Perlman et al. |
| 2003/0012199 | A1 | 1/2003 | Ornes et al. |
| 2003/0081600 | A1* | 5/2003 | Blaker et al. ......... 370/389 |
| 2003/0095536 | A1 | 5/2003 | Hu et al. |
| 2003/0099232 | A1 | 5/2003 | Kudou et al. |
| 2003/0123447 | A1* | 7/2003 | Smith ......... 370/394 |
| 2005/0018682 | A1 | 1/2005 | Ferguson et al. |
| 2005/0025152 | A1 | 2/2005 | Georgiou et al. |
| 2005/0089038 | A1 | 4/2005 | Sugai et al. |

OTHER PUBLICATIONS

Office Action from U.S. Appl. No. 13/090,362, dated Aug. 4, 2011, 21 pages.

Co-pending U.S. Appl. No. 11/857,086, entitled "Systems and Methods for Processing Any-To-Any Transmissions", by Spencer Greene, filed on Sep. 18, 2007, 35 pages.

Co-pending U.S. App. No. 12/511,856, entitled "Systems and Methods for Re-Ordering Data in Distributed Data Forwarding", by Dennis Ferguson et al., filed on Jul. 29, 2009, 38 pages.

Co-pending U.S. Appl. No. 13/090,362, entitled "Systems and Methods Order Preserving Data", by Spencer Greene, filed on Apr. 20, 2011, 37 pages.

Office Action from U.S. Appl. No. 12/511,856, dated May 19, 2011, 8 pages.

Office Action from U.S. Appl. No. 12/511,856, dated Dec. 9, 2010, 11 pages.

* cited by examiner

SYSTEMS AND METHODS FOR DISTRIBUTED DATA FORWARDING

CROSS REFERENCE TO RELATED APPLICATIONS

The instant application claims priority from provisional application No. 60/382,020, filed May 22, 2002, the disclosure of which is incorporated by reference herein in its entirety.

BACKGROUND OF THE INVENTION

1. Field of the Invention

The present invention relates generally to data processing devices, and more particularly, to systems and methods for preserving the order of data processed by multiple processing paths in data processing devices.

2. Description of Related Art

In network devices that must deliver high throughput in forwarding a stream of data, a conventional approach is to provide n independent paths and distribute sub-streams of the data down each of the n paths. After processing by each of the n processing paths, the sub-streams are recombined to create an output stream. A problem that arises using this technique is that the different processing paths may have different delays. As a result, if a first block of data (e.g., a packet or cell) is sent down a first path at time $t_1$ and a second block of data is sent down a second path at time $t_2 > t_1$, the second block of data may nonetheless finish being processed before the first. Therefore, if nothing is done to correct for this differential delay, the recombined stream of data will be out-of-order relative to the input stream. Out-of-order blocks of data can be problematic in a number of networking applications.

There are well-known algorithms for restoring order to mis-ordered streams at recombination time, based on attaching sequence numbers to consecutive blocks at input, and sorting blocks to restore consecutive sequence numbers on output. However, in some applications, a given output will not receive all sequence numbers from a given input, making the standard sorting algorithms impractical.

Therefore, there exists a need for systems and methods that can preserve the order of blocks of data in data streams that have been distributed across multiple paths in a network device.

SUMMARY OF THE INVENTION

Systems and methods consistent with the principles of the invention address this and other needs by providing a re-ordering mechanism that re-orders, by stream, data blocks received out-of-order from multiple processing paths. The re-order mechanism, consistent with the principles of the invention, keeps track of one or more processing characteristics associated with the processing of each data block which occurs within the multiple processing paths. The one or more tracked processing characteristics, thus, may be used as a stream identifier so that re-order of data blocks within each stream prevents a later data block in a stream from being forwarded earlier than an earlier data block in the same stream. Systems and methods consistent with the principles of the invention, therefore, may correct the out-of-order data blocks within streams that result from using parallel processing paths.

One aspect consistent with principles of the invention is directed to a method for preserving the order of blocks of data in multiple data streams transmitted across multiple processing paths. The method includes receiving input blocks of data on the multiple data streams in a first order and distributing the input blocks of data to the multiple processing paths. The method further includes receiving processed blocks of data from the multiple processing paths and re-ordering the processed blocks of data in the first order based on a count for each block of data.

A second aspect consistent with principles of the invention is directed to a method of method of re-ordering data blocks in multiple data streams. The method includes receiving input data blocks in a first order and processing the input data blocks, the processing including performing one or more route look-ups. The method further includes re-ordering the processed input data blocks based on a number of the one or more route look-ups associated with each of the input data blocks.

A third aspect consistent with principles of the invention is directed to a method of routing data blocks in multiple data streams. The method includes referencing routing data one or more times for each of the data blocks to determine an appropriate routing path for each of the data blocks. The method further includes re-ordering the data blocks within, each data stream of the multiple data streams by comparing a number of routing data references associated with each of the data blocks. The method also includes routing each of the data blocks via the appropriate routing path.

A fourth aspect consistent with principles of the invention is directed to a method of re-ordering data blocks processed in multiple data streams, the processing including performing one or more route look-up operations for each of the data blocks. The method includes tracking, for each of the data blocks, a number of the one or more route look-up operations performed for each of the data blocks. The method further includes re-ordering the data blocks according to the number of route look-up operations performed for each of the data blocks.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Exemplary Network Device

Figure 1:
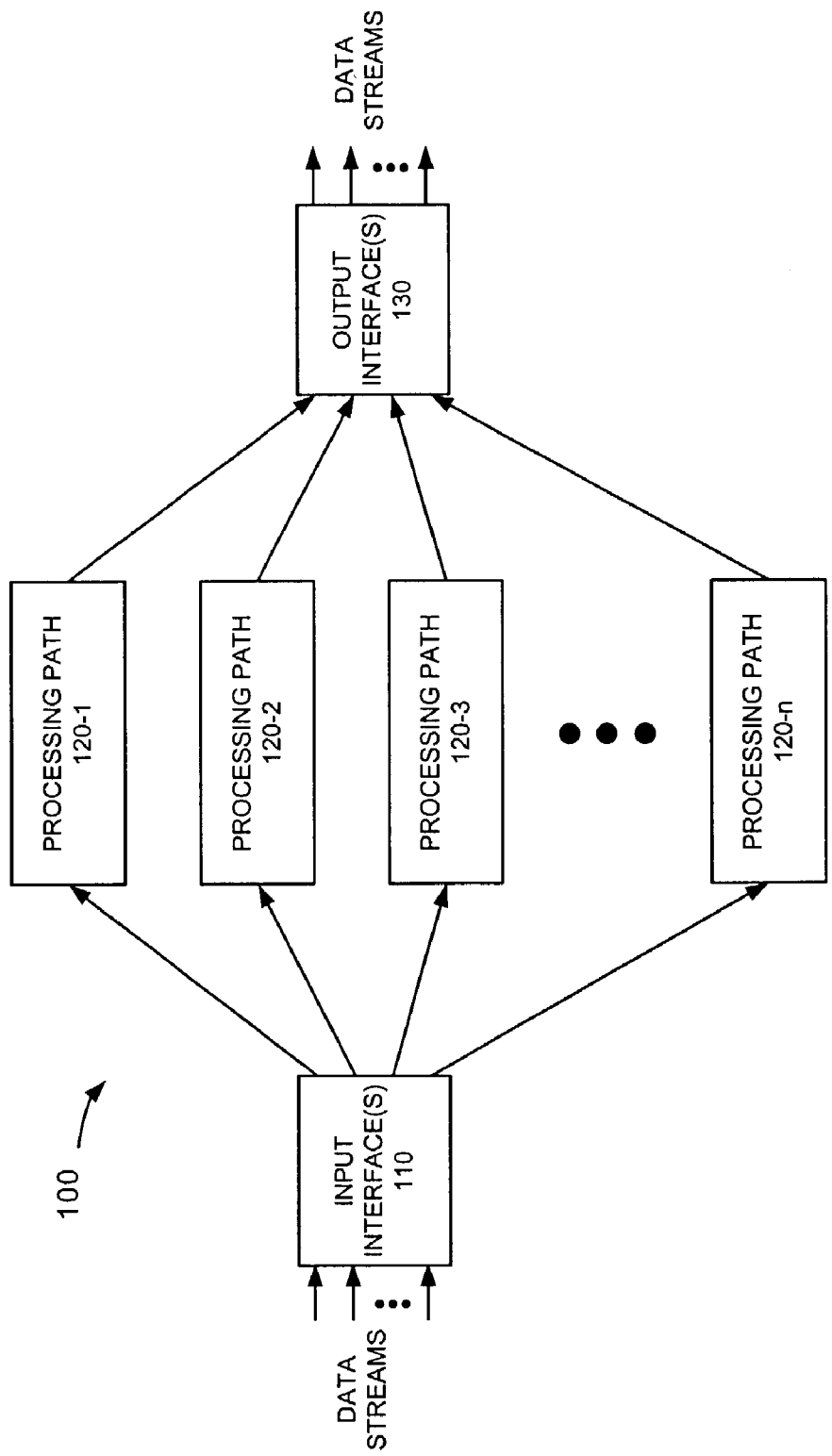
FIG. 1 is a diagram of an exemplary network device in which systems and methods consistent with the principles of the invention may be implemented.

FIG. 1 is a diagram of an exemplary network device 100 that restores the order of data blocks sent across multiple processing paths in a manner consistent with the principles of the invention. Network device 100 may include one or more input interfaces 110, multiple processing paths 120-1 through 120-*n*, and one or more output interfaces 130. Each input interface 110 may include circuitry for receiving and processing a stream of data blocks. These data blocks may include, for example, packets, datagrams, cells, fragments of packets, datagrams, or cells, or other types of data. A data stream may include multiple blocks of data received at input interface 110 that have an identical source and destination.

Processing paths 120 may include any number of devices that may independently process blocks of data received from input interface 110. Such devices may be connected in series and/or parallel and may include multiple processors, such as, for example, route look-up processors. For example, each processing path 120 may perform a route look-up process for each received block of data to determine an appropriate outgoing route for the data block. Each route look-up process may include, for example, a number of references to memory (not shown) that further includes routing data accumulated through conventional routing protocols. Consistent with the principles of the invention, any processing characteristic, or combination of processing characteristics, associated with each block of data, may be used for stream identification. For example, a number of references to memory for route look-up for each block of data may be used as a stream identifier. Streams may also be identified in other ways, such as, for example, by counting the number of times context is switched for a particular block. Therefore, blocks of data with a different count can be considered as from different streams. Blocks of data with the same count may be from the same stream. A combination of multiple criteria may also be used for identifying a stream (e.g., a number of references to memory for route lookup and a number of times context is switched). When one of the processing paths 120 receives a data block from input interfaces 110, it sends a new lookup signal to output interfaces 130. Alternatively, output interfaces 130 could snoop the buses between input interfaces 110 and processing paths 120 and determine that a new lookup has started based on the snoop. When one of processing paths 120 finishes a route lookup, it sends a "lookup finished" signal to output interfaces 130. Output interfaces 130 may include circuitry for re-ordering blocks of data received from the n processing paths 120 and outputting the re-ordered blocks of data as an outgoing data stream.

Exemplary Output Interface

Figure 2:
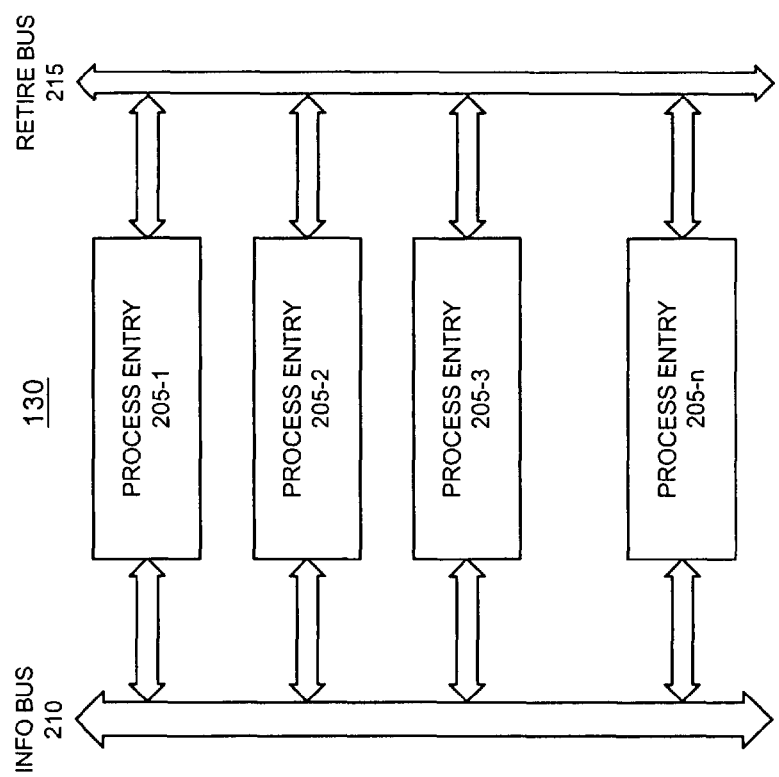
FIG. 2 is a diagram of exemplary components of an output interface consistent with the principles of the invention.

FIG. 2 is an output interface 130 according to an implementation consistent with the principles of the invention. Output interface 130 may receive data blocks, associated with one or more data streams, from processing paths 120-1 through 120-N. The received data blocks may be out of order relative to the order the data blocks were received at input interface(s) 110. Output interface 130 may re-order the received data blocks based on one or more processing characteristics associated with each of the received data blocks. Indications of the appropriate one or more processing characteristics may be received from processing paths 120-1 through 120-N via info bus 210.

As illustrated, each output interface 130 may include a group of process entries 205-1 through 205-*n* connected via an info bus 210 and a retire bus 215. Each process entry 205 may keep track of one or more processing characteristics, such as, for example, a number of counts for the route look-up process associated with that process entry 205 and may retire the process (i.e., send the corresponding data block out an outgoing interface) under appropriate conditions. Each process entry 205 may receive new lookup, count update and lookup finished signals from processing paths via info bus 210. Each process entry 205 may further receive data indicating which processes have retired via retire bus 215.

Exemplary Data Block Re-Ordering Logic

Figure 3:
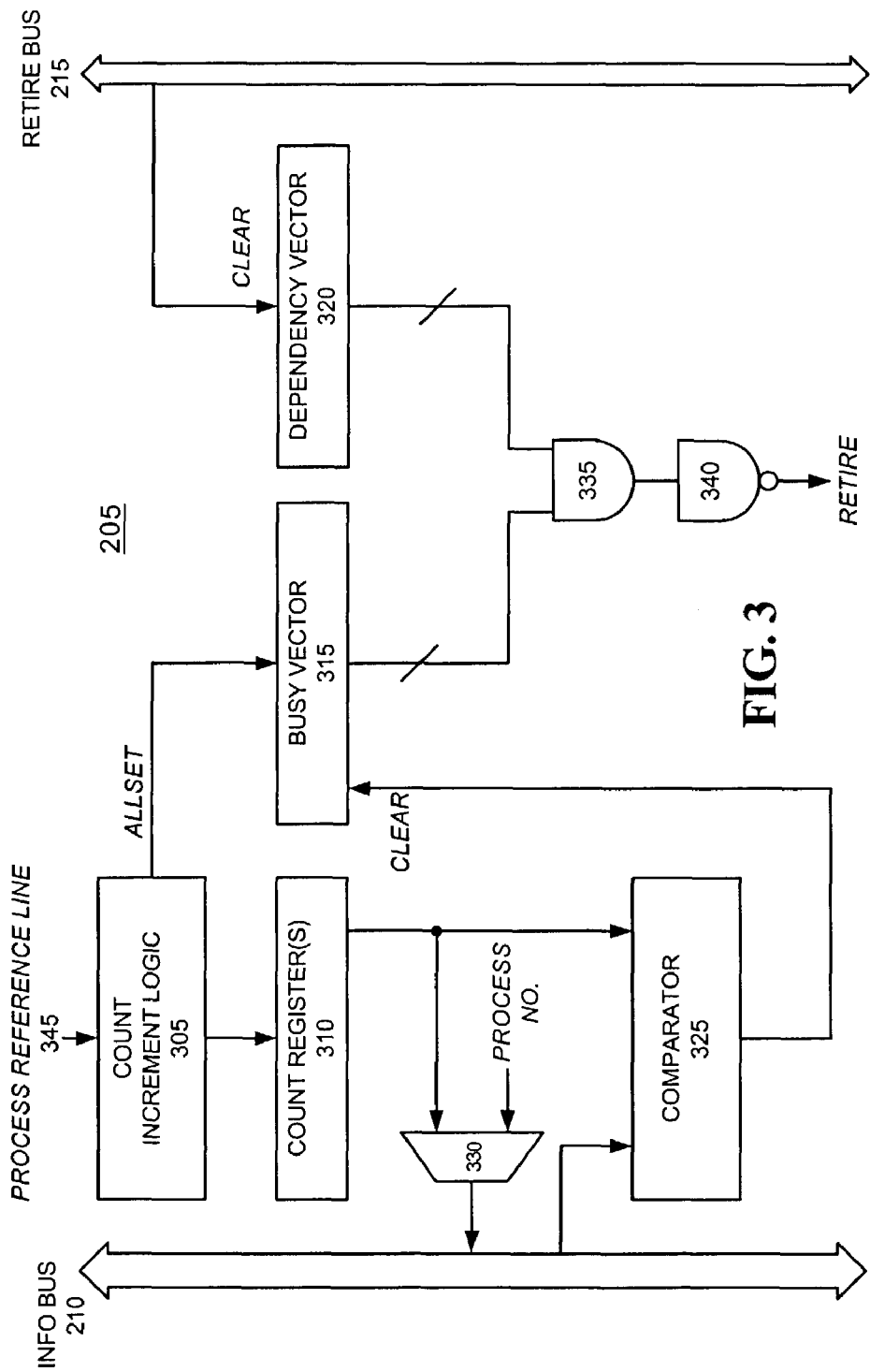
FIG. 3 is a diagram of an exemplary process entry of FIG. 2 consistent with the principles of the invention.

FIG. 3 is a diagram of an exemplary process entry 205 according to an implementation consistent with principles of the invention. Process entry 205 may include COUNT increment logic 305, COUNT register(s) 310, BUSY_VECTOR register 315, DEPENDENCY_VECTOR register 320, comparator 325, multiplexer (MUX) 330, AND gate 335, and NAND gate 340. COUNT increment logic 305 may increment the one or more counts contained in COUNT register(s) 310 according to one or more processing characteristic references, such as, for example, a process memory reference, received via process reference line 345. COUNT increment logic 305 may further send an ALLSET command to BUSY_VECTOR register 315 to set all bits contained in BUSY_VECTOR register 315 when a new process, such as, for example, a new route lookup process, is assigned to process entry 205. BUSY_VECTOR register 315 may indicate which other process entries 205 may have a smaller COUNT register 310 value(s) than the current process entry. For example, BUSY_VECTOR register 315 may include a bit for each other process entry 205, with each bit reset if the corresponding process entry has a higher COUNT register 310 value(s) than its own process entry 205.

The count(s) contained in COUNT register(s) 310, and the corresponding process number of the current process entry 205, may be passed by MUX 330 to info bus 210 utilizing, for example, time division multiplexing (TDM). Comparator 325 may compare a count(s), such as, for example, a memory reference count, from COUNT register(s) 310 with counts received from all the other process entries 205. For each other process entry that has a count(s) greater than its own COUNT 310 register(s) value, comparator 325 may clear a corresponding bit in BUSY_VECTOR register 315. BUSY_VECTOR register 315, therefore, keeps track of which other process entries 205 have higher counts. When one of process entries 205 is completed, each other process entry 205 with a higher count may be considered to be part of a different data stream.

DEPENDENCY_VECTOR 320 register may indicate which process entries were active when the current process entry was assigned a route look-up process. By definition, each process entry that was active when the current process was assigned a route look-up has a smaller sequence number than the current process entry. For example, DEPENDENCY_VECTOR register 320 may include a bit for each process entry 205, with each bit set if the corresponding process entry is currently active. AND gate 335 may logically AND the bits of BUSY_VECTOR register 315 and DEPENDENCY_VECTOR register 320 to determine whether the current process may be retired and the corresponding data block sent out to an outgoing interface. The process's retiring condition may include the following:

DEPENDENCY_VECTOR AND BUSY_VECTOR=0
According to this retiring condition, the current process may be retired only when all other processes in the same stream (e.g., memory reference count less than, or equal to, the current process memory reference count) have retired (e.g., corresponding bit in DEPENDENCY_VECTOR register 320 cleared). Since other processes that are active, with a corresponding bit in DEPENDENCY_VECTOR register 320 set, by definition have lower sequence numbers, a data block corresponding to a current process can be sent out an output interface in-order within its stream by sending it out ("retiring the process") when all other processes have retired (bits in DEPENDENCY_VECTOR register 320 cleared). The output of AND gate 335 may pass through NAND gate 340 to produce an indication of whether the process is retiring. If retiring, the process entry's assigned process number may be passed to retire bus 215 for reception by other process entries. For each indication of a retired process received via retire bus 215, a corresponding bit in the current process's DEPENDENCY_VECTOR register 320 may be cleared.

Exemplary Distributed Data Block Forwarding Process

Figure 4:
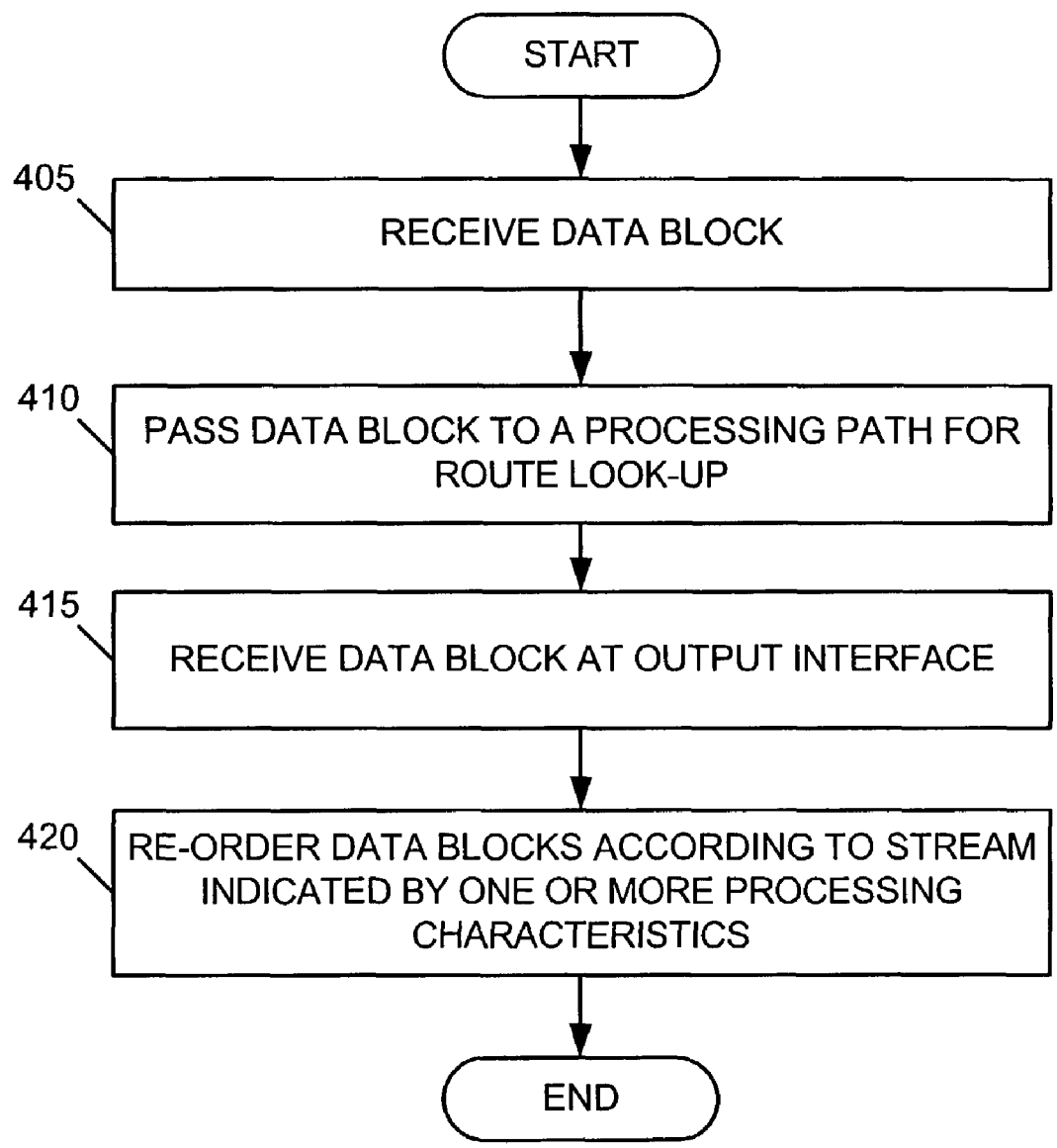
FIG. 4 is a flowchart of an exemplary process for distributed data block forwarding according to implementations consistent with principles of the invention.

FIG. 4 is a flowchart of an exemplary distributed data block forwarding process in accordance with implementations consistent with the principles of the invention. The exemplary process may begin with the reception of a data block at an input interface 110 (act 405). The data block may then be passed to one of the processing paths 120-1 through 120-$n$ for route look-up (act 410). For example, the data block may be passed to one of the processing paths according to a conventional load-balancing scheme. After the route look-up operation has been performed, the data block may be received from a processing path 120 at output interface 130 (act 415). Blocks received at output interface 130 may be re-ordered according to a stream indicated by one or more processing characteristics, such as, for example, routing memory look-ups (act 420).

Exemplary Data Block Re-Ordering Process

Figure 5:
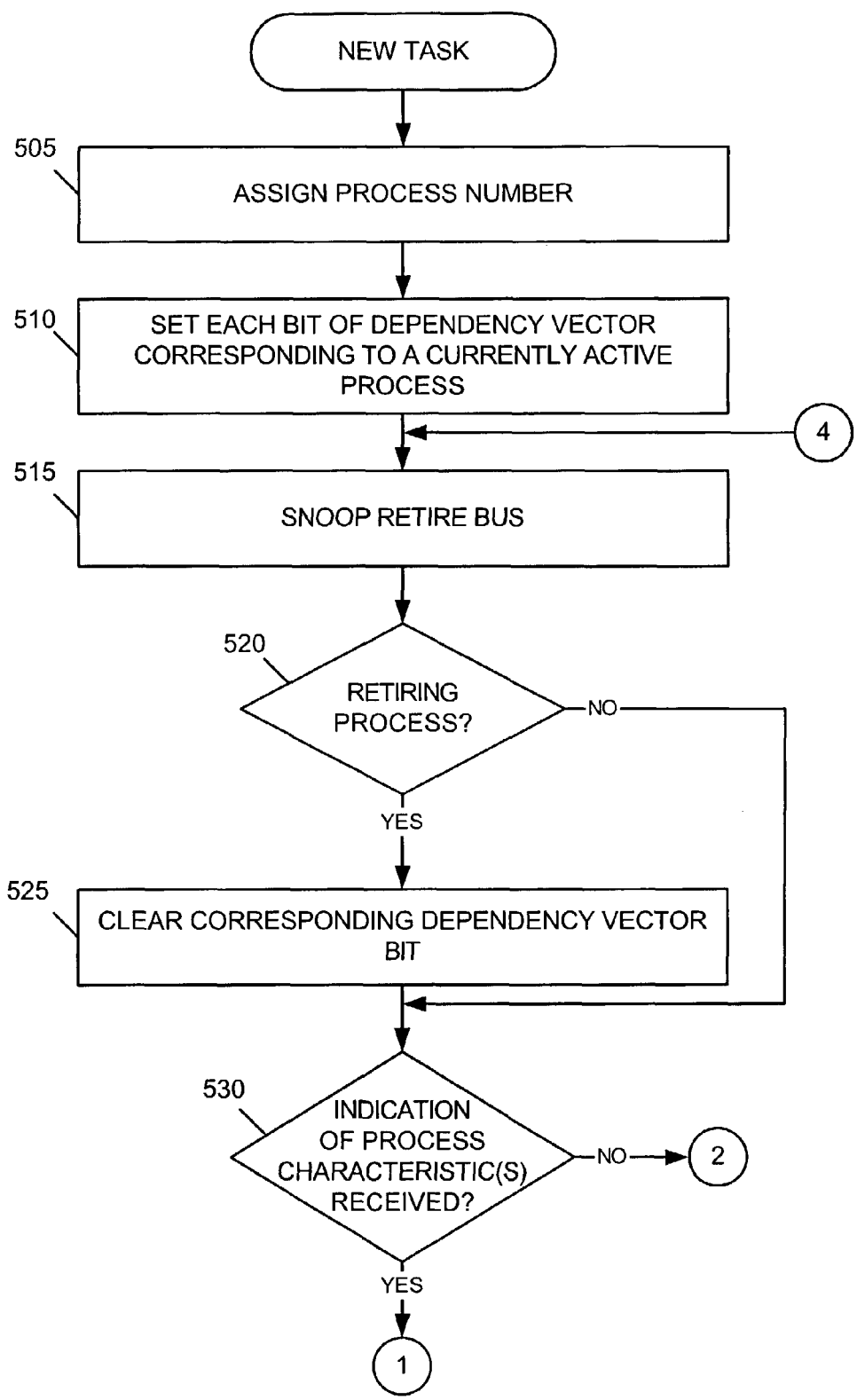
FIGS. 5-7 are flowcharts of an exemplary data block re-ordering process according to an implementation consistent with principles of the invention.
Figure 6:
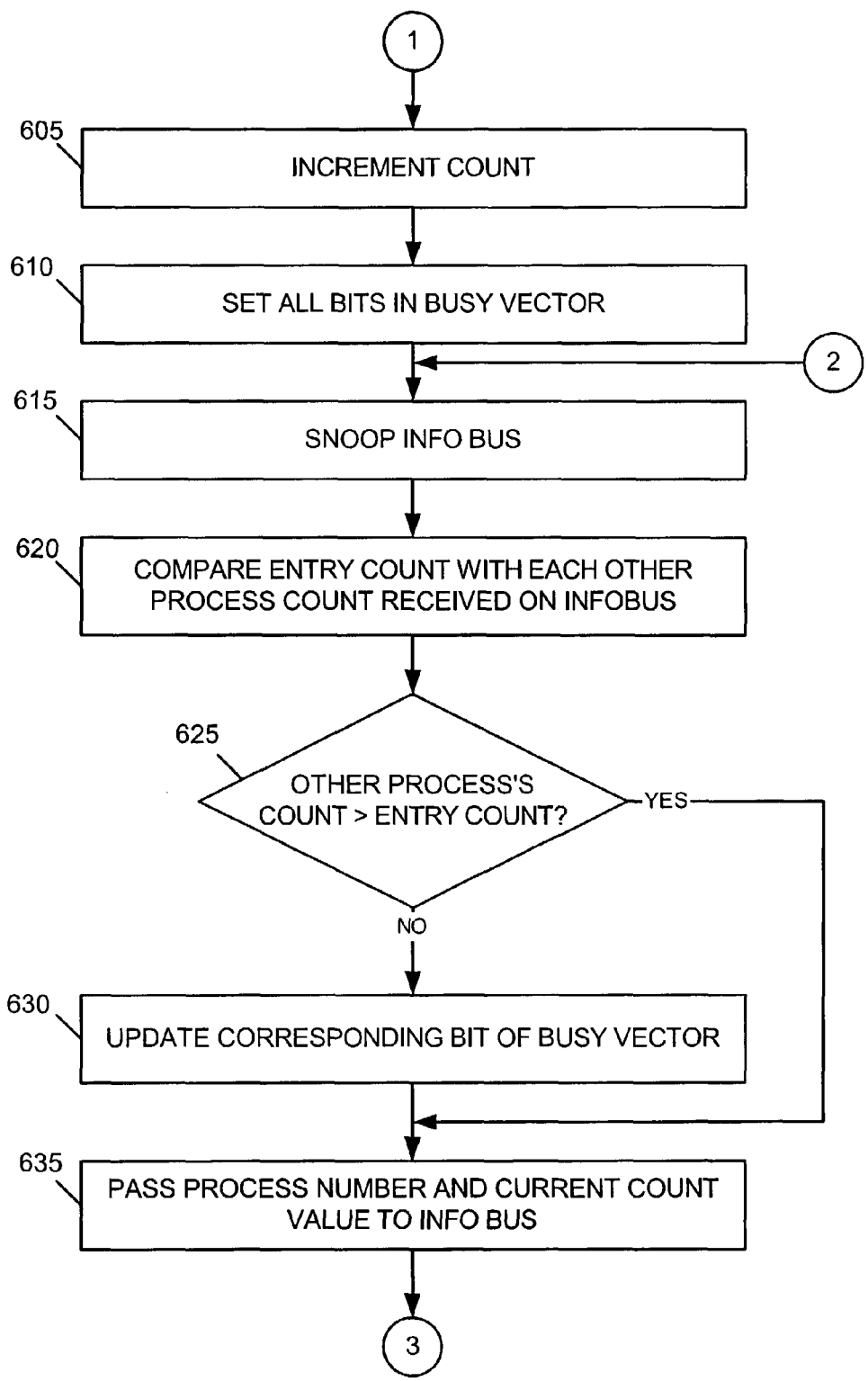
Figure 7:
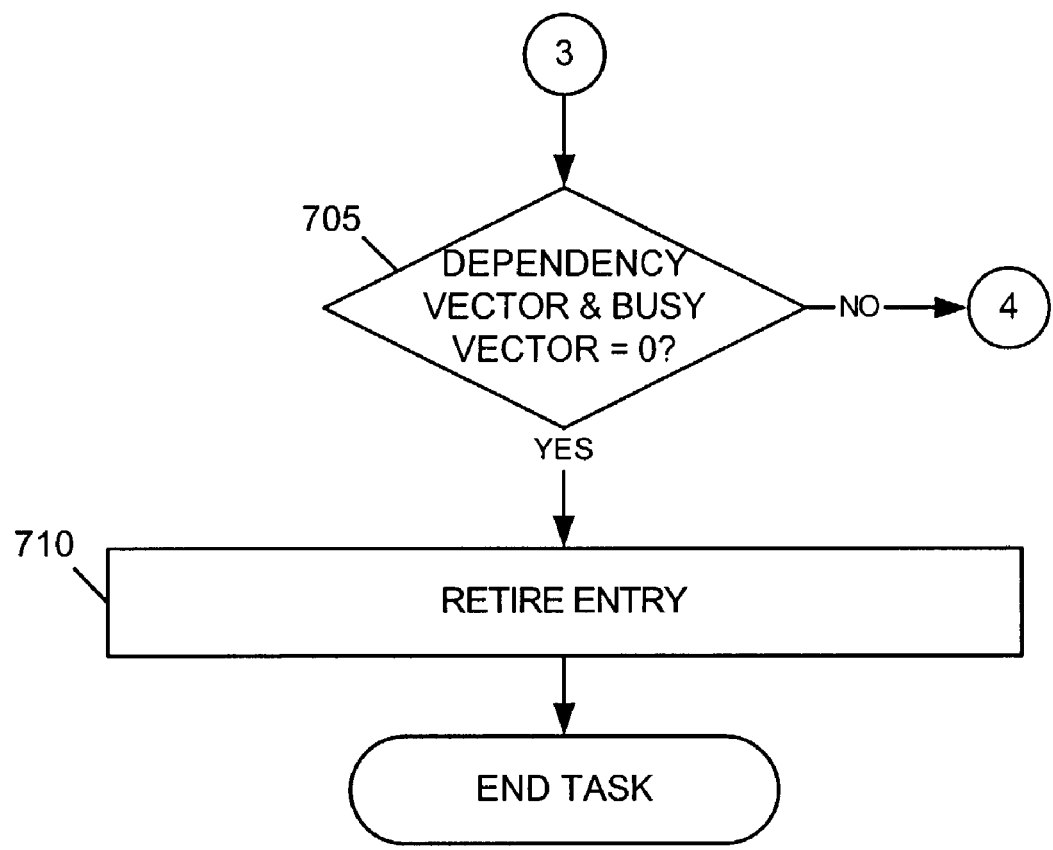

FIGS. 5-7 are flowcharts of an exemplary data block re-ordering process according to an implementation consistent with principles of the invention. The process of FIGS. 5-7 may be implemented by a process entry 205 that corresponds to a look-up process for a given data block. The process may begin with the assignment of a process number to a new task, such as, for example, a new routing lookup task, corresponding to a data block passed to a processing path 120 (act 505). Each bit of DEPENDENCY_VECTOR register 320 corresponding to a currently active process may then be set (act 510). Retire bus 215 may further be snooped to detect any retiring processes (act 515). If an indication of a retiring process is received from other process entries (act 520), then a bit in DEPENDENCY_VECTOR register 320, that corresponds to the retiring process, may be cleared (act 525).

A determination may then be made whether an indication of one or more processing characteristics, such as, for example, a memory reference, has been received via process memory reference line 345 (act 530). If not, the process may continue at act 615 (FIG. 6). If an indication of one or more processing characteristics, such as, for example, a memory reference, has been received, COUNT register(s) 310 may be incremented (act 605). All bits in BUSY_VECTOR register 315 may further be set (act 610) by, for example, COUNT increment logic 305. Info bus 210 may be snooped by process entry 205 to receive COUNT register values from other process entries (act 615). COUNT register 310 may be compared with each other process COUNT register value received on info bus 210 (act 620). Based on the comparison, a determination may be made whether each of the other process COUNT register values are greater than the current process entry COUNT register 310 (act 625). If greater than, the process may continue at act 635. If any of the other process COUNT register values are not greater than the current process entry COUNT register 310, then a corresponding bit of BUSY_VECTOR register 315 may be updated (act 630). The process entry 205 process number and current COUNT register 310 value may be passed to info bus 210 in, for example, a time division multiplex fashion (act 635).

A determination may then be made whether a logical AND of the bits in DEPENDENCY_VECTOR register 320 and BUSY_VECTOR register 315 produces a logical zero value (act 705)(FIG. 7). If not, the process may continue at act 515 (FIG. 5). If the logic AND operation produces a logical zero value, then process entry 205 may be retired (act 710). Process entry 205's process number may then be passed on retire bus 215 and the data block corresponding to the process entry may be forwarded out an output interface of output interfaces 130 towards its intended destination.

CONCLUSION

Consistent with the principles of the present invention, a re-ordering mechanism re-orders, by stream, data blocks received out-of-order from multiple processing paths. The re-order mechanism keeps track, for example, of a number of memory references that occur when a route look-up is performed for routing each received data block. The number of memory references, for example, may be used as a stream identifier so that re-ordering of data blocks within each stream prevents a sequentially later data block in a stream from being forwarded earlier than a sequentially earlier data block in the same stream.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While series of acts have been described in FIGS. 4-7, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for preserving the order of blocks of data in a plurality of data streams transmitted across a plurality of processing paths, comprising:
   receiving input blocks of data on the plurality of data streams in a first order;
   distributing the input blocks of data to the plurality of processing paths;
   determining an outgoing route for each of the blocks of data by referencing routing data stored in memory;
   receiving processed blocks of data from the plurality of processing paths; and
   re-ordering the processed blocks of data in the first order based on a count for each block of data, where the count comprises a number of routing data memory references performed for each input block of data.

2. The method of claim 1, wherein the count comprises a number of context switches performed for each input block of data.

3. The method of claim 1, wherein each of the plurality of processing paths processes the distributed blocks with a different processing time.

4. The method of claim 1, wherein the first order comprises input blocks of data in sequential order.

5. The method of claim 4, wherein the processed blocks of data comprise blocks of data out of the sequential order.

6. A device, comprising:
a memory storing routing data;
at least one input interface configured to:
receive input blocks of data on a plurality of data streams in a first order, and
distribute the input blocks of data to a plurality of processing paths, the plurality of processing paths configured to:
determine an outgoing route for each of the blocks of data by referencing the routing data; and
at least one output interface configured to:
receive processed blocks of data from the plurality of processing paths, and
re-order the processed blocks of data in the first order based on a count for each block of data, where the count comprises a number of routing data memory references performed for each input block of data.

7. The device of claim 6, wherein the count comprises a number of context switches performed for each input block of data.

8. The device of claim 6, wherein each of the plurality of processing paths processes the input blocks with a different processing time.

9. The device of claim 6, wherein the first order comprises input blocks of data in sequential order.

10. The device of claim 9, wherein the processed blocks comprise blocks of data out of sequential order.

11. A method of re-ordering data blocks in a plurality of data streams, comprising:
receiving input data blocks in a first order;
processing the input data blocks, the processing including performing one or more route look-ups; and
re-ordering the processed input data blocks based on a number of the one or more route look-ups associated with each of the input data blocks.

12. The method of claim 11, wherein the number of route look-ups performed for each input block of data identifies one of the plurality of data streams with which the input block of data is associated.

13. The method of claim 11, wherein the input data blocks comprise at least one of packets, cells, datagrams, fragments of packets, fragments of cells, or fragments of datagrams.

14. The method of claim 11, wherein the one or more route look-ups determine routing destinations for each of the input data blocks.

15. A network device, comprising:
at least one input interface configured to receive data blocks comprising a plurality of streams in a first order;
at least one processing path configured to process each of the data blocks, the processing including performing one or more route look-ups for each of the data blocks; and
at least one output interface configured to re-order the data blocks based on a number of the one or more route look-ups associated with each of the data blocks.

16. The network device of claim 15, wherein the number of route look-ups performed for each data block identifies one of the plurality of streams with which the data blocks are associated.

17. The network device of claim 15, wherein the data blocks comprise at least one of packets, cells, datagrams, fragments of packets, fragments of cells, or fragments of datagrams.

18. The network device of claim 15, wherein the one or more route look-ups determine routing destinations for each of the data blocks.

19. A method of routing data blocks in a plurality of data streams, comprising:
referencing routing data one or more times for each of the data blocks to determine an appropriate routing path for each of the data blocks;
re-ordering the data blocks within each data stream of the plurality of data streams by comparing a number of routing data references associated with each of the data blocks; and
routing each of the data blocks via the appropriate routing path.

20. The method of claim 19, wherein the number of routing data references performed for each data block identifies a data stream of the plurality of data streams associated with each data block.

21. The method of claim 19, wherein the data blocks comprise at least one of packets, cells, datagrams, fragments of packets, fragments of cells, or fragments of datagrams.

22. A network device, comprising:
a memory storing routing data;
at least one input interface configured to receive data blocks on a plurality of data streams;
at least one processing path configured to reference the routing data one or more times for each of the data blocks to determine an appropriate routing path for each of the data blocks; and
at least one output interface configured to:
re-order the data blocks within each data stream of the plurality of data streams by comparing a number of routing data references associated with each of the data blocks, and
route each data block via the appropriate routing path.

23. The network device of claim 22, wherein the number of routing data references performed for each data block identifies a data stream of the plurality of data streams associated with each data block.

24. The network device of claim 22, wherein the data blocks comprise at least one of packets, cells, datagrams, fragments of packets, fragments of cells, or fragments of datagrams.

25. A method of re-ordering data blocks processed in a plurality of data streams, the processing including performing one or more route look-up operations for each of the data blocks, the method comprising:
tracking, for each of the data blocks, a number of the one or more route look-up operations performed for each of the data blocks; and
re-ordering the data blocks according to the number of route look-up operations performed for each of the data blocks.

26. The method of claim 25, wherein the number of route look-up operations performed for each of the data blocks identifies a data stream associated with each of the data blocks.

27. The method of claim 25, wherein the data blocks comprise at least one of packets, cells, datagrams, fragments of packets, fragments of cells, or fragments of datagrams.

28. A network device, comprising:
a memory configured to store routing data; and
at least one interface configured to:
receive data blocks from a plurality of data streams,
track, for each of the data blocks, a number of routing data look-up operations performed to determine a routing path for each of the data blocks, and re-order the data blocks according to the number of routing data look-up operations performed to determine the routing path for each of the data blocks.

29. The network device of claim 28, wherein the number of routing data look-up operations performed for each of the data blocks identifies a data stream associated with each of the data blocks.

30. The network device of claim 28, wherein the data blocks comprise at least one of packets, cells, datagrams, fragments of packets, fragments of cells, or fragments of datagrams.

\* \* \* \* \*